United States Patent
Kechler et al.

(10) Patent No.: US 10,698,069 B2
(45) Date of Patent: Jun. 30, 2020

(54) METHOD FOR ADJUSTING AN EQUATORIAL OR ALTAZIMUTH MOUNT

(71) Applicant: robomotion GmbH, Leinfelden-Echterdingen (DE)

(72) Inventors: Konstantin Kechler, Leinfelden-Echterdingen (DE); Steffen Mayer, Leinfelden-Echterdingen (DE)

(73) Assignee: robomotion GmbH, Leinfelden-Echterdingen (DE)

( * ) Notice: Subject to any disclaimer, the term of this patent is extended or adjusted under 35 U.S.C. 154(b) by 359 days.

(21) Appl. No.: 15/549,149

(22) PCT Filed: Feb. 1, 2016

(86) PCT No.: PCT/DE2016/100044
§ 371 (c)(1),
(2) Date: Oct. 24, 2017

(87) PCT Pub. No.: WO2016/127977
PCT Pub. Date: Aug. 18, 2016

(65) Prior Publication Data
US 2018/0172796 A1    Jun. 21, 2018

(30) Foreign Application Priority Data
Feb. 9, 2015 (DE) .......... 10 2015 101 781

(51) Int. Cl.
*G01S 3/786* (2006.01)
*G02B 23/16* (2006.01)

(52) U.S. Cl.
CPC .......... *G01S 3/7867* (2013.01); *G01S 3/7864* (2013.01); *G01S 3/7865* (2013.01); *G02B 23/165* (2013.01); *G02B 23/16* (2013.01)

(58) Field of Classification Search
CPC ...... G01S 3/7867; G01S 3/786; G01S 3/7865; G01S 3/7864; G02B 23/165; G02B 23/16; F16M 11/18
(Continued)

(56) References Cited

U.S. PATENT DOCUMENTS

| | | | |
|---|---|---|---|
| 5,365,269 A | 11/1994 | Holmes et al. | |
| 2011/0285855 A1* | 11/2011 | Ota | G01S 3/7864 348/169 |

(Continued)

FOREIGN PATENT DOCUMENTS

| | | |
|---|---|---|
| GB | 2344951 A | 6/2000 |
| GB | 2485596 A | 5/2012 |

(Continued)

*Primary Examiner* — Jade R Chwasz
*Assistant Examiner* — Rahman Abdur
(74) *Attorney, Agent, or Firm* — Smartpat PLC

(57) ABSTRACT

The present invention relates to a method for readjusting a parallactic or azimuthal mounting, comprising a device which is intended for positioning and moving a telescope with a camera and can be aligned and readjusted by means of at least one image sensor and an electromotorized controller, characterized in that the image sensor acts as a main recording sensor of the camera and at the same time as an alignment sensor and readjustment control sensor, wherein before and after a main image is taken at least one control image is taken with a shorter exposure time and these control images are compared with one another, or at least a main image itself acts as a control image and is compared with at least one previous main image, or a short-exposed control image is compared with the main image itself and the correction values for the readjustment of the mounting are determined by the image offset and the time difference of the images taken. The method is the prerequisite for easy, (Continued)

error-free operation of an astronomical mounting for the purpose of long-exposure astronomical photography.

2 Claims, 1 Drawing Sheet

(58) Field of Classification Search
USPC .......................................................... 359/430
See application file for complete search history.

(56) References Cited

U.S. PATENT DOCUMENTS

2013/0265639 A1  10/2013  Batchvarov
2014/0085717 A1   3/2014  Baun et al.

FOREIGN PATENT DOCUMENTS

| WO | 2000019710 A1 | 4/2000 | |
|---|---|---|---|
| WO | WO-0019710 A1 * | 4/2000 | ......... H04N 5/37206 |
| WO | 2006113938 A1 | 10/2006 | |

* cited by examiner

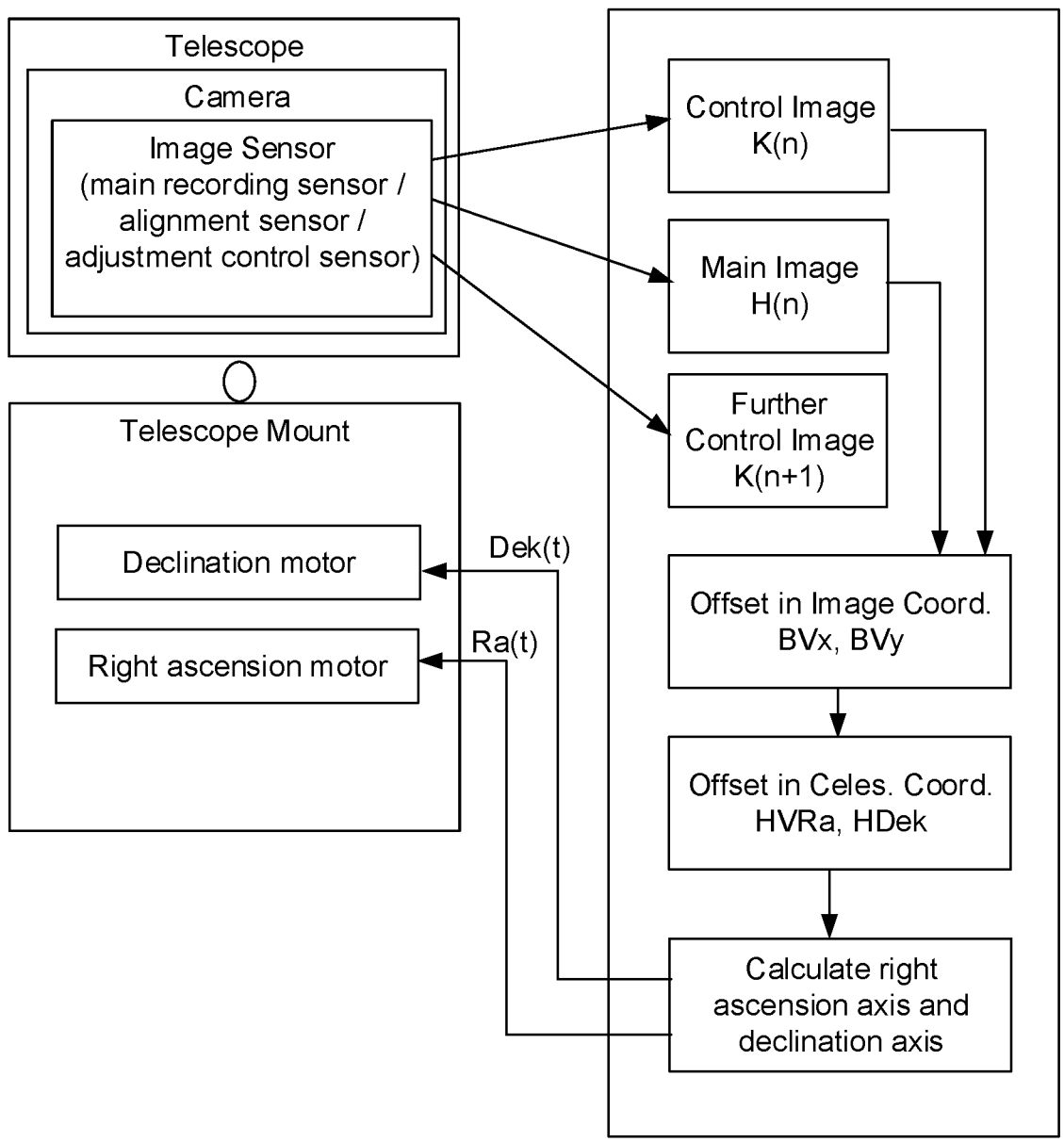

METHOD FOR ADJUSTING AN EQUATORIAL OR ALTAZIMUTH MOUNT

TECHNICAL FIELD

The present invention relates to a method for adjusting an equatorial or altazimuth mount, comprising a device for positioning and moving a telescope having a camera, wherein the mount can be oriented and adjusted by means of at least one image sensor and an electromotorized controller.

BACKGROUND

Astrophotography requires long exposure times, which presuppose that the telescope is accurately aligned by means of a motor drive (for example, step motors). A corresponding controller makes it possible to orient the telescope to an observation object and to track it.

Equatorial mounts can be pivoted for this purpose in the right ascension axis and declination axis. The polar axis must be oriented parallel to the axis of the earth in order to counteract a constant velocity (sidereal) in the driven right ascension axis of the rotation of the earth. Since this placement is very error-prone, the two axes are increasingly equipped with motors and driven to compensate for the error of incorrect placement.

Telescopes with larger focal lengths (>300 mm) are often used for astrophotography and longer (>5 min) exposure times are selected in order to take images. In combination with current cameras and their image sensors with small pixels (<10 μm), very high accuracies (path deviation of max.+−1" in 10 minutes) are necessary during tracking. Even with perfect alignment of the mount, the movement of the axes with the engines and gearboxes available today would be too inaccurate to meet these requirements. For this reason, the drives must be regulated as a function of the measured movement of the axes.

Up till now, so-called "autoguiders" have been increasingly used for measuring the movement of the axes, wherein these systems require a second image sensor that observes a guide star and determines its position. When a deviation from the target position occurs, a correction for the movement of the axes is calculated and sent to the axis controller. This is a control circuit, which has to be correspondingly parameterized with great effort. Autoguiders exist in different designs, either as an additional image sensor in special cameras, having their own optics mounted on the telescope or mounted in the beam path of the main optics with the aid of an off axis guider. The disadvantage of the autoguider is that the complexity of the entire system increases and operability is made more difficult, because, among other things, a control system, depending on the optics and mount, must be parameterized. Furthermore, power consumption is increased by the second camera and, if necessary, by a second dew protection for the guide scope.

Another known method is the creation of a pointing model. With the aid of the mounted optics and camera, the position of celestial objects is then determined exactly. After measuring the position of several objects, a model is calculated with which such a mount can be accurately positioned and adjusted. The disadvantage of this method is that the models lose their validity when the mount changes its position. The smallest changes in the position or orientation between the mount and the celestial object are sufficient for this purpose. Such changes can occur on the stand, the telescope and the camera. This is especially the case in mobile operation (e.g., by sinking of the stand or by thermal expansion in the mount).

A pointing model for the mount is provided in US 2013/0 265 639 A1. This is done before the actual taking of the main images. The main sensor does not function as an adjustment control sensor, but as a sensor for the one-time creation of the pointing model. US 2013/0 265 639 A1 also describes the calibration of rotary encoders by means of astronomical methods so that lower cost rotary encoders can be used. In this case, the actual adjustment takes place via a previously determined pointing model and does not use the main sensor for adjustment control.

GB 2 485 596 A describes a system that integrates an adjustment control camera and optics into the mount (self-guiding mount). An additional camera and optics are necessary for the actual main image, wherein, however, no main image is taken with the adjustment control camera.

A system is also described in US 2014/0 085 717 A1, which integrates an adjustment control camera and an optical system in the mount. In addition, a further imaging sensor and an optical system are provided, with which an exact measurement of the position in the sky is possible. An additional camera and optics are necessary for the actual main image, wherein no main image is created with the sensors and optics used.

SUMMARY

The object of the present invention is to create a method which is suitable for eliminating the complexity of the operation and the system configuration when using autoguiders and the error-proneness of systems that are based on pointing models.

According to the invention, the foregoing object is achieved according to the preamble of claim 1 in conjunction with the characterizing features. Advantageous embodiments and further developments of the method according to the invention are given in the dependent subclaims.

According to the invention, a method of the type mentioned in the introduction is characterized in that the image sensor acts as a main recording sensor of the camera and likewise as an alignment sensor and tracking control sensor, wherein before and after a main image is taken at least one control image with a shorter exposure time is taken and these control images are compared with one another, or at least one main image itself acts as a control image and is compared with at least one previous main image, or a short exposure control image is compared with the main image itself and the correction value for adjusting the mount is determined through the image offset and the time difference of the images taken. The orientation of the camera is calibrated in right ascension and declination in order to determine the image offset in the axes.

The method is particularly advantageous in that a correction value for the movement of the axes is determined and the error in the tracking is measured regularly with the following steps:

a) Taking a control image K(n);
b) Taking the main image H(n);
c) Taking a control image K(n+1);
d) Determining the time difference dt between control image K(n) and K(n+1) and the subpixel accurate image offset BVx and BVy in image coordinates between the control images K(n) and K(n+1);

e) Determining the offset in celestial coordinates HVRa and HVDek based on BVx and BVy and the position of the image in the celestial coordinates HRa and HDek;
f) Calculating a new function Ra(t) and Dek(t) for the angular position of the axis as a function of time, based on the time difference dt and the offset HVRa and HVDek;
g) Increasing n to n+1 and repeating steps a) to g), wherein the axes are moved according to the new calculated function RA(t) and Dek(t).

According to the invention, the image offset of the images is determined with subpixel accuracy by image processing. By considering the time difference between the control images and the conversion of image coordinates into celestial coordinates, the temporal angular change which is caused by the incorrect placement of the mount is determined.

This computes the placement error and transforms this back to the temporally continuing image offset for the next main exposure. In this case, a function of the error curve Ra(t) and Dek(t) is calculated and transferred to the controller in order to operate the axes at a calculated angular velocity, wherein the differential refraction (deltaRaRefrakt and deltaDecRefrakt) is also taken into account.

The function is calculated as follows:

I. Movement of the Ra axis with (Vsidereal) sidereal angular velocity $$Ra(t)=Vsidereal*t,$$

$$Dek(t)=0$$

II. Determination of the new angular velocity based on the time difference and the offset taking into account the differential refraction $$VRaKorr=(HVRa-deltaRaRefrakt)/dt+Vsidereal,$$

$$VDekKorr=(HVDek-deltaDecRefrakt)/dt$$

III. Movement of the axes with the determined functions $$Ra(t)=VRaKorr*t,$$

$$Dek(t)=VDekKorr*t$$

IV. Determination of the new angular velocity based on the time difference and the offset taking into account the differential refraction $$VRaKorr=(HVRa-deltaRaRefrakt)/dt+VRaKorr,$$

$$VDekKorr=(HVDek-deltaDecRefrakt)/dt+VDekKorr$$

V. Repetition of steps III to V.

It is thus possible to determine a correction for the tracking through an imaging sensor in order to eliminate the tracking error in both axes in a controlled manner and to react to changes in the position or orientation between the mount and the celestial object since the correction calculation is performed at the time intervals of the main images. This enables longer exposure times without image errors.

BRIEF DESCRIPTION OF THE DRAWING

The sole FIGURE shows a schematic block diagram of telescope with a camera having an image sensor mounted on a motorized telescope mount. The FIGURE further illustrates method steps of a method to control motors of the telescope mount.

DETAILED DESCRIPTION OF AN EXEMPLARY EMBODIMENT

The implementation of the method according to the invention is explained stepwise in the following by way of an exemplary embodiment of an existing system. The system consists of an equatorial mount with high-resolution rotary encoders and step motors on both axes. The motor control of the system enables the evaluation of the rotary encoders, control of the motors and precise regulation of the axes.

In this case, a digital single-lens reflex camera having a live view mode is used as an image sensor. The evaluation is performed on an additional computer (laptop) with the aid of software. The software includes integrated functions such as, for example, complete control of the digital single-lens reflex, two-star method for calculating the placement error based on the position of two stars, calculation and transfer of the correction values to the controller and image processing algorithms for the offset determination.

The mount is leveled with the aid of a bubble level and is aligned parallel to the axis of the earth by means of a compass and a setting circle. In addition, the geographic coordinates of the site are entered into the software for the calculation. Also conceivable is the simplified design of the alignment and operation by the use of inclination (leveling) and direction sensors (elevation) and a GPS sensor for the automatic determination of the location.

Alternatively, the leveling can be dispensed with by determining the difference angle of the azimuthal coordinate systems of the mount and the earth and taking this into consideration in the correction.

With the integrated GoTo function, the optics is driven to a bright star which is known from the database. With the live view of the camera and the interface to the software, the user has the option of focusing the optics through the magnification of the star. The orientation of the camera on the optics is determined with the function of the automatic camera calibration, in that the controller first pivots a monitored star with the right ascension axis to one image edge, stores the image coordinates, and then moves to the other image edge in order to calculate the orientation angle of the camera.

After the camera calibration, the controller executes the two-star method to minimize the placement error. The known star is automatically moved into the center of the image, the axis positions are calibrated by the rotary encoders and pivoted to a further known star to compare the deviation of the axis position from the star position.

With the two-star equation, the software calculates the placement error of the mount and visually displays the correction values in azimuth and elevation to the user, which can be corrected in the live image on a star. After the correction has been completed, the camera alignment is automatically rechecked and adjusted if necessary. The user can then move to a desired object, set the exposure times and number of images, and start the image cycle.

The software automatically records short control images before and after each main image, which are then compared to each other. In the first embodiment of the method, in this case, only the right ascension axis is driven sidereally. The image offset between the control images is determined by an image processing algorithm (e.g., FOCAS Automatic Catalog Matching Algorithm). The exposure time and ISO value of the control images are automatically adjusted, in which the algorithm evaluates the control image and searches for sufficient details. If there are insufficient or no details to be seen, the exposure time and/or the ISO value of the control images are automatically increased.

Thus, a subpixel-accurate evaluation of the offset is achieved in both axes, the proportion of the temporal angular change between the control images in declination and right ascension is calculated by a conversion of image coordinates into celestial coordinates using the axis positions and the parameters of the optics (focal length, pixel size, . . . ) entered thereinto.

Based on these values and taking into account the differential refraction, a local error model is created at the desired location in order to obtain the correct target position as a function of the time for the declination and right ascension axis.

The effect of the refraction is well known and can therefore be corrected in the control software. The atmospheric refraction is dependent on air pressure, temperature and height of the object. However, since only the differential refraction is necessary in this method, the height of the object is primarily relevant.

The local error model calculates the placement accuracy and transforms this back to the temporally continuing image offset for the next main exposure. A polynomial of the error curve is calculated in this case and passed to the controller in order to operate the axes with a dynamic tracking speed.

This procedure is repeated for further main images, wherein the tracking speeds of the axes are recalculated and adapted each time.

By means of this method, it is thus possible to eliminate the error of the placement and the differential refraction and to changes in position or orientation between mount and the celestial object and to enable images with longer exposure times without tracking errors.

Method without Correcting the Placement

In a further exemplary embodiment without correction of the elevation and azimuth axes, the mount is first set up and the polar axis is aligned as precisely as possible. The alignment can be performed by means of a polar finder or by compass and angle scale. The more precise the placement, the smaller the image field rotation, depending on the length of the exposure, position in the sky and the size of the image field. The horizontal leveling can be dispensed with completely since this has no effect on the tracking.

After placement, the orientation of the camera is adjusted. In this case, a star is placed in the image field and the camera is oriented in such a way that the star is horizontal during a movement of the right ascension axis.

The position of the object to be exposed is now controlled, the regulation for the right ascension is activated and started with a short-exposure control image. This is followed immediately by a long main image, which is in turn concluded with a brief control image.

Based on the two control images, the image offset is now determined by a suitable image processing algorithm. The most common method is triangulation. The algorithm searches as many as possible triangles that connect the stars and thus calculates the offset and the rotation between the reference and control image.

A further possibility for offset determination is an algorithm which operates with two-dimensional cross-correlation in the image plane. The signal of the first reference image is compared with the signal of the second control image and the maximum is searched for.

Next, the calculated offset of pixels is converted to the angular dimension. The value in this case depends on the focal length of the optics and the pixel size of the camera.

Based on the offset in the angular dimension and the temporal difference of the recorded control images, a temporal angular velocity can be calculated based on the target position and actual position.

In order to achieve a tracking which is as error-free as possible, an extended error model is created, which also takes into account the proportion of the differential refraction. This results in a function of the error curve of both axes, which can be almost completely eliminated by adapting the angular velocity of the controllers.

The invention claimed is:

1. A method for adjusting an equatorial or altazimuth mount with electric motors based on data received from an image sensor, the mount carrying a telescope with a camera,
   wherein the image sensor serves a main recording sensor of the camera and also as an alignment sensor and adjustment control sensor,
   and wherein before and after a main image is taken two control images with a shorter exposure time than the main image are taken and these control images are compared to one another,
      or at least one main image serves as a control image and is compared to at least one previous main image,
      or a short exposure control image is compared to a main image,
   and wherein correction values for the adjustment of the mount are determined by an image offset and a time difference (dt) of the images taken,
   wherein a correction value for a movement of axes of the mount is determined and an error in the adjustment is regularly measured comprising:
   a) taking a control image (K(n));
   b) taking a main image (H(n));
   c) taking a further control image (K(n+1));
   d) determining a time difference (dt) between the control image (K(n)) and the further control image (K(n+1))
   e) determining a subpixel accurate image offset in image x-coordinates (BVx) and in image y-coordinates (BVy) between the control image K(n) and the further control image K(n+1);
   f) determining an offset in celestial right ascension coordinates (HVRa) and celestial declination coordinates (HVDek) based on the image offset in image x-coordinates (BVx) and the image offset in image y-coordinates (BVy) and a position of the image in celestial coordinates right ascension (HRa) and declination (HDek);
   g) calculating an angular position of a right ascension axis (Ra(t)) and an angular position of a declination axis (Dek(t)) over time (t), based on a sidereal angular velocity (Vsidereal) as Ra(t)=Vsidereal*t, Dek(t)=0;

h) determining a corrected right ascension angular velocity (VRaKorr) and a corrected declination angular velocity (VDekKorr) on the basis of the time difference (dt), the sidereal angular velocity (Vsidereal), the offset in celestial right ascension coordinates (HVRa) and the celestial declination coordinates (HVDek) as VRaKorr=(HVRa−deltaRaRefrakt)/dt+Vsidereal, VDekKorr=(HVDek−deltaDecRefrakt)/dt;

i) moving the right ascension axis (Ra(t)) and the declination axis (Dek(t)) over time (t) based on Ra(t)=VRaKorr*t, Dek(t)=VDekKorr*t;

j) determining a new corrected right ascension angular velocity (VRaKorr') and a new corrected declination angular velocity (VDekKorr') on the basis of the time difference (dt), the offset in celestial right ascension coordinates (HVRa), the celestial declination coordinates (HVDek), and the previously determined corrected right ascension angular velocity (VRaKorr) and the previously determined corrected declination angular velocity (VDekKorr) as VRaKorr'=HVRa/dt+VRaKorr, VDekKorr'=HVDek/dt+VDekKorr; and k) repeating steps i)-k).

2. A method for adjusting an equatorial or altazimuth mount with electric motors based on data received from an image sensor, the mount carrying a telescope with a camera,
wherein the image sensor serves a main recording sensor of the camera and also as an alignment sensor and adjustment control sensor,
and wherein before and after a main image is taken two control images with a shorter exposure time than the main image are taken and these control images are compared to one another,
or at least one main image serves as a control image and is compared to at least one previous main image,
or a short exposure control image is compared to a main image,
and wherein correction values for the adjustment of the mount are determined by an image offset and a time difference (dt) of the images taken,
wherein a correction value for a movement of axes of the mount is determined and an error in the adjustment is regularly measured, comprising:
a) taking a control image (K(n));
b) taking a main image (H(n));
c) taking a further control image (K(n+1));
d) determining a time difference (dt) between the control image (K(n)) and the further control image (K(n+1))
e) determining a subpixel accurate image offset in image x-coordinates (BVx) and in image y-coordinates (BVy) between the control image K(n) and the further control image K(n+1);
f) determining an offset in celestial right ascension coordinates (HVRa) and celestial declination coordinates (HVDek) based on the image offset in image x-coordinates (BVx) and the image offset in image y-coordinates (BVy) and a position of the image in celestial coordinates right ascension (HRa) and declination (HDek);

g) calculating an angular position of a right ascension axis (Ra(t)) and an angular position of a declination axis (Dek(t)) over time (t), based on a sidereal angular velocity (Vsidereal) as Ra(t)=Vsidereal*t, Dek(t)=0 h) determining a corrected right ascension angular velocity (VRaKorr) and a corrected declination angular velocity (VDekKorr) on the basis of the time difference (dt), the sidereal angular velocity (Vsidereal), the offset in celestial right ascension coordinates (HVRa) and celestial declination coordinates (HVDek), and a differential right ascension refraction (deltaRaRefrakt) and differential declination refraction (deltaDecRefrakt) as VRaKorr=(HVRa−deltaRaRefrakt)/dt+Vsidereal, VDekKorr=(HVDek−deltaDecRefrakt)/dt;

i) moving the right ascension axis (Ra(t)) and the declination axis (Dek(t)) over time (t) based on Ra(t)=VRaKorr*t, Dek(t)=VDekKorr*t;

j) determining a new corrected right ascension angular velocity (VRaKorr') and a new corrected declination angular velocity (VDekKorr') on the basis of the time difference (dt), the offset in celestial right ascension coordinates (HVRa), the celestial declination coordinates (HVDek), the previously determined corrected right ascension angular velocity (VRaKorr) and the previously determined corrected declination angular velocity (VDekKorr), and the differential right ascension refraction (deltaRaRefrakt) and the differential declination refraction (deltaDecRefrakt) as VRaKorr'=(HVRa−deltaRaRefrakt)/dt+VRaKorr, VDekKorr'=(HVDek−deltaDecRefrakt)/dt+VdekKorr; and k) repeating steps i)-k).

* * * * *